No. 809,346. PATENTED JAN. 9, 1906.
A. E. WATTS.
AUTOMATIC TRIPPING DEVICE FOR PHOTOGRAPHIC SHUTTERS.
APPLICATION FILED DEC. 20, 1904.
2 SHEETS—SHEET 1.
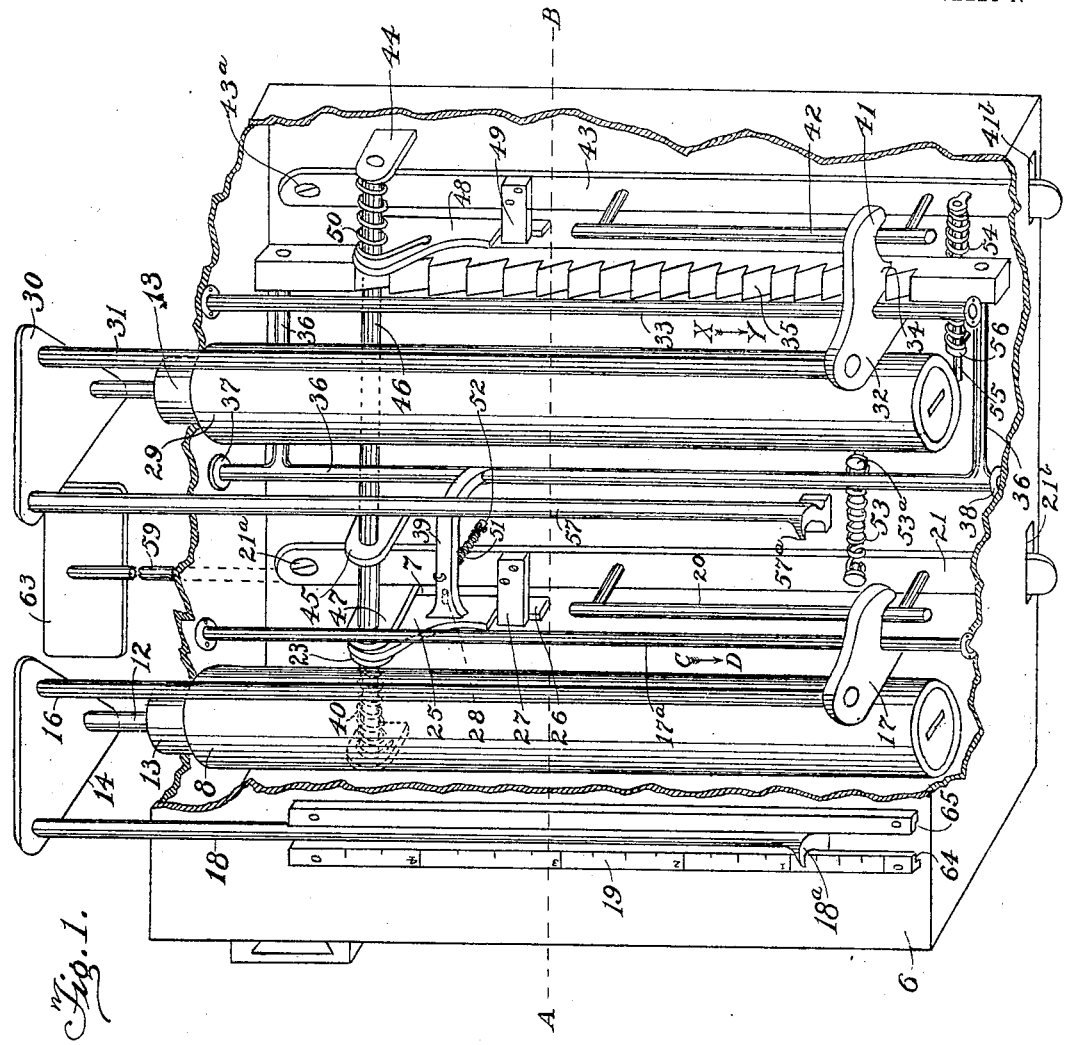
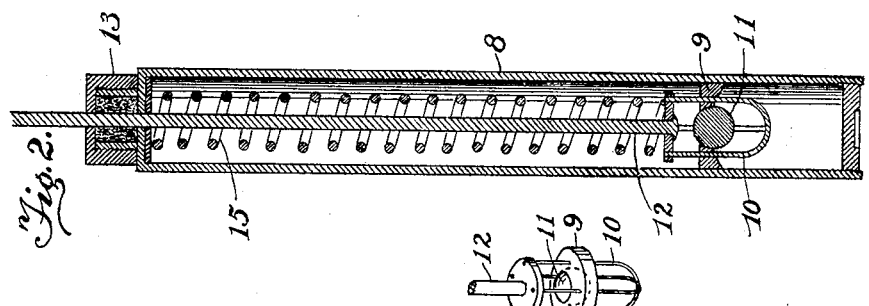
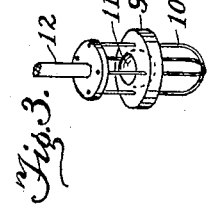
WITNESSES:
Charles S. Olson
Wellington M. Blewett
INVENTOR.
Alfred E. Watts No. 809,346. PATENTED JAN. 9, 1906.
A. E. WATTS.
AUTOMATIC TRIPPING DEVICE FOR PHOTOGRAPHIC SHUTTERS.
APPLICATION FILED DEC. 20, 1904.
2 SHEETS—SHEET 2.
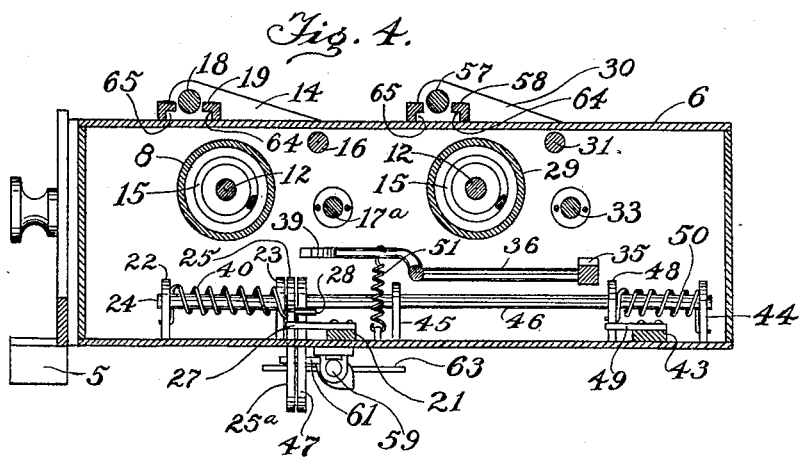
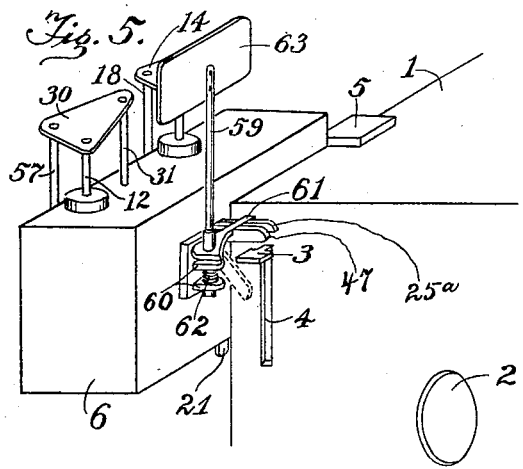
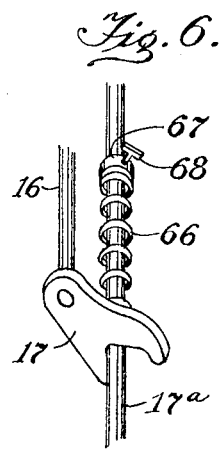
WITNESSES:
Charles L. Olson
Wellington M. Blewett
INVENTOR.
Alfred E. Watts

UNITED STATES PATENT OFFICE.

ALFRED E. WATTS, OF DULUTH, MINNESOTA.

AUTOMATIC TRIPPING DEVICE FOR PHOTOGRAPHIC SHUTTERS.

No. 809,346.      Specification of Letters Patent.      Patented Jan. 9, 1906.

Application filed December 20, 1904. Serial No. 237,636.

*To all whom it may concern:*

Be it known that I, ALFRED E. WATTS, a citizen of the United States, residing at Duluth, in the county of St. Louis and State of Minnesota, have invented certain new and useful Improvements in Automatic Tripping Devices for Photographic Shutters; and I do hereby declare the following to be a full, clear, and exact description of the invention, such as will enable others skilled in the art to which it appertains to make and use the same.

My invention relates to automatic trip mechanism for operating the operating or release lever of the trip mechanism of camera-shutters or other devices, and has for its object the provision of mechanism, which for convenience I will call the "secondary trip mechanism," adapted to operate the release-lever of the trip mechanism of a camera-shutter, which latter said mechanism I will for convenience call the "primary trip mechanism," in such manner as that after said primary mechanism has been set for operation to effect when operated the opening of said shutter for either a limited or an unlimited period and after said secondary mechanism has been set for operation and the operation thereof initiated the photographer may abandon control of both mechanisms and said secondary mechanism will continue in operation to automatically approximately at a predetermined time initiate the operation of said primary mechanism and at a predetermined time or approximately at a predetermined time thereafter, if necessary, effect the completion of said operation of said primary mechanism.

With these and other objects in view it consists, in combination with a suitable support and the release or operating means or lever, of devices to be operated—as, for example, the frame and shutter operating lever of a photographic camera, of secondary tripping mechanism mounted on said support or frame and adapted to automatically operate said operating or release lever.

It further consists of the constructions, combinations, and arrangements of parts hereinafter described and claimed.

In the drawings, Figure 1 is a perspective view of my said invention, parts of the casing being broken away to disclose the interior and one of the graduated scales or dials being omitted. Fig. 2 is a vertical section of either one of the brake-cylinders and contents forming part of my invention. Fig. 3 is a perspective view of the piston contained in each of said cylinders. Fig. 4 is a horizontal section showing the upper portion of said invention on the plane A B of Fig. 1. Fig. 5 is a reduced perspective view of a portion of a camera-box, showing my invention mounted thereon. Fig. 6 is a detail of a modified portion of said invention, showing an additional or optional spring device.

In the drawings, 1 is a camera-box having the lens or view-aperture 2, containing a shutter, (not shown,) such devices being of variable construction and well-known to the art and not thought necessary to be particularly described herein. Said camera is also provided with a shutter-operating lever 3 of any suitable construction adapted to be set for operation at the upper end of the slot 4 and to be pressed downward to operate said shutter. Said lever may, however, be arranged in a variety of ways and my invention positioned to operate it when so arranged. While, therefore, describing the action or position of said lever with relation to said invention as illustrated, I do not desire to be limited to such particular arrangement or position. Mounted on said camera-box, or on any support suitable for the purpose, by any suitable means, as by a clamp or bracket 5, is a casing 6 of any suitable construction, having the slot 7 formed in one of its walls. Positioned in said casing is a brake-cylinder 8, containing an apertured piston 9, provided with a check-valve of any suitable construction, preferably comprising a cage 10, containing a loosely-inclosed ball 11 of greater diameter than the aperture in said piston. Secured to said piston at the opposite side thereof from the main body of said ball by any suitable means, as by an extended portion of said cage, is a piston-rod 12, projecting outwardly from said cylinder, preferably through a stuffing-box 13, mounted thereon. To the upper end of said piston-rod is secured a cross-head or cross-plate 14. Within said cylinder at one end thereof opposite from said ball and preferably coiled around said piston-rod is a spring 15, adapted to bear against one end of said cylinder and against said piston directly or indirectly and having a tendency to force said piston toward the opposite end of said cylinder. Said cylinder is filled on both sides of said piston with a fluid of any suitable density. Secured to said cross-head or plate, but depending therefrom outside of said cylinder, is a rod 16, to the opposite end of which is secured a foot 17, preferably adapted to engage guiding means of any suitable construction, as a guide-rod 17ᵃ, positioned within and secured to said casing. Also secured in part to said cross head or plate is an indicating device of any suitable construction, as a rod 18, depending therefrom outside of said cylinder, and preferably outside of said casing and provided at its free end with an indicating-finger 18ᵃ, adapted, in connection with the markings of a time-scale or dial 19, to indicate how long it will take said foot 17 under the impulse of its actuating-spring device or devices, as of the spring 15, to slip in the direction C to D from the rod 20, which is bracketed upon and forms part of a lever or arm 21 and which rod 20 said foot 17 is adapted to engage when in set position. It is obvious, however, that said indicating device may be modified or altered in construction, while still embodying the principles of my invention, and I do not, therefore, desire to be limited to the exact construction of those parts as shown. Journaled in suitable brackets or bearings, as 22 and 23, secured in or to said casing, is a shaft 24, to which is rigidly secured a spring-operated bell-crank lever 25, one arm 25ᵃ of which is adapted to extend outwardly of said casing through said slot 7 and in operation to strike upon said lever 3. The other arm of said lever 25 is provided with a terminal finger 26, forming part thereof and adapted in operative or "set" position to engage a finger 27, mounted on and forming part of a swinging arm 21, which latter arm is pivoted, as at 21ᵃ, to said casing or to a suitable support therein. Extending from the side of the last said arm of said lever 25 is a pin 28, forming part thereof. (Shown in broken lines in Fig. 1 and in solid lines in Fig. 4.) Positioned within said casing is a second cylinder 29, similar to said cylinder 8 and containing an apertured piston, cage, ball, piston-rod, and spring, all similar, respectively, to such devices designated by the numerals 9, 10, 11, 12, and 15 in Fig. 2 of the drawings or equivalent construction. A stuffing-box, as 13, is also mounted on said cylinder 29. Said cylinder 29 is also filled on both sides of its piston with fluid of suitable density. A cross head or plate 30 is secured to the outer end of the piston-rod which extends from said cylinder 29. Secured to the last said cross head, but depending therefrom outside of said cylinder, is a rod 31, the opposite end of which is provided with a foot 32, adapted to engage guiding means of any suitable construction—as, for example, a post 33. Said foot has formed thereon a toe 34, adapted in operation to engage a tooth of a ratchet 35, carried by and forming part of a swinging frame or lever 36, which frame is pivoted, as at 37 and 38, to any suitable support, as to said casing. Said swinging frame is provided with an arm 39, forming part thereof, extending in the approximate direction of the side of said lever 25. A spring device of any suitable construction is provided for actuating said lever 25, and preferably consists of a coiled spring 40, mounted on said shaft 24 and secured at one end to said bearing 22 and at the opposite end to said lever 25 in such manner that it will in operation force the outward end of said lever downward and the opposite end of said lever back in the direction of said arm 39, by which movement of said lever the pin 28, forming part thereof, will be carried against the free end of said arm 39, by which said swinging frame will be swung on its pivots and the ratchet 35 will be disengaged from said toe 34. The foot 32 is also provided with a second toe 41, adapted in set position to engage a post 42, bracketed upon and forming part of a swinging arm or lever 43, which is pivoted to any suitable support, as at 43ᵃ, to said casing. Journaled in suitable brackets or bearings 44 and 45, mounted on said casing, is a shaft 46, upon which is mounted an arm 47, adapted to project outwardly of said casing through a suitable slot, as at 7, and in operation to strike upon said lever 3 of said camera. Rigidly secured to said shaft 46 is a lever 48, the free end of which is in set position adapted to engage a finger 49, carried by and forming part of said arm 43, which levers 48 and 47 are so arranged on said shaft 46 that when said lever is engaged by said finger 49 in set position said arm 47 will be in a suitable preparatory position for striking said lever 3. A spring device of any suitable construction is provided for rocking said shaft after said lever 48 is released by said finger 49, and preferably consists of a coiled spring 50, mounted on said shaft 46 and secured at one end to said bearing 44 and at the other end to said lever 48 in such manner that when said lever is released by said finger 49 the spring 50 will actuate said lever and cause it to rock said shaft in the direction necessary to cause it to carry said arm 47 against said lever 3. A spring device of any suitable construction is provided for normally holding said swinging frame 36 in set position, and consists, preferably, of a coiled spring 51, attached at one end to said arm 39 and at the opposite end to said casing, as at 52. It will be observed that the spring 51 will yield slightly to permit said ratchet to recede from the toe 34 when said toe is being drawn upward along said ratchet; but when the edge of said toe is opposite a notch in the ratchet said ratchet will advance to engage it. A spring device of any suitable construction is provided for retracting said arm 21, and preferably consists of a coiled spring 53, secured at one end to said arm 21 and at the opposite end to said casing, as at 53ᵃ. A spring device of any suitable construction is also provided for retracting the arm 43, and preferably consists of a coiled spring 54, secured at one end to said arm 43 and coiled about an alining rod 55 and bearing against the support 56 of said rod. Said rods 21 and 43 are adapted to extend outwardly of said casing through slots 21$^b$ and 43$^b$, respectively, to afford finger-holds upon said arms. Secured in part to said cross head or plate 30 is an indicating device of any suitable construction, as a rod 57, depending therefrom outside of said cylinder 29, and preferably outside of said casing, and provided at its free end with an indicator-finger 57$^a$, adapted, in connection with any suitable markings on a graduated time scale or dial 58, to indicate how long it will take said foot 32 under the impulse of its actuating-spring device or devices, as of the spring 15, to slip in the direction X to Y from said rod 42 after said foot has been released by said ratchet. Mounted upon said casing is a signal, comprising a rock-shaft 59, journaled in a bracket or bearing 60, secured to said casing, which shaft is provided at its foot with a lever 61, adapted in operation to engage suitable notches formed in the edges of the arm 25$^a$ and the arm 47. A spring device of any suitable construction is provided to rock said shaft, and preferably consists of a spring 62, coiled about said shaft 59 and secured at one end to said lever 61 and bearing at the opposite end against said bracket 60 in such manner that when said lever 61 is released by said arm 25$^a$ and said arm 47 said lever 61 will under the influence of said spring 62 rock said shaft 59 and expose to view from a position in front of the camera a notice exhibited on a signboard 63, carried upon the opposite end of said shaft 59, which notice is to the effect that the plate in the camera has been exposed or any other notice which will indicate that the operation of the invention is completed. Guides of any suitable construction, as 64 and 65, are preferably mounted upon said casing and are adapted to loosely engage the finger 18$^a$. Similar guides are preferably provided to engage the finger 57$^a$. If desired, a spring or spring device or devices of any suitable construction, as 66, preferably adjusted by a collar 67 and set-screw 68, may be provided outside of the cylinders to operate upon the feet 17 or 32, or both of them. It is obvious also that within the scope of my invention the arm 25$^a$ may be separate from the remainder of the lever 25, said arm being separately keyed to said shaft 24, only a very slight variation of the position of the parts being necessary for the purpose, and, if desired, the arm 45 may be made integral with the lever 48 and project through a separate slot similar to slot 7, a very slight variation of the position or dimension of the parts being necessary to that purpose. Other modifications or alterations in the details of construction may also be made within the scope and spirit of my said invention, and I do not, therefore, desire to limit myself to the exact details shown except when specifically claimed.

In operation the signal-lever is swung to a position over the arm 25$^a$ and the finger 47, which said arm and finger are then raised manually until said signal-lever is engaged by the notches formed therein. Said arm and finger are held manually or by any suitable means in such position while the arms 43 and 21 are drawn into proper position for engaging the finger 49 with the lever 48 and for engaging the finger 27 with the finger 26. The manual support of the arm 25 and of the finger 47 may then be withdrawn, the manual control of the arms 43 and 21 being temporarily retained. The cross-head 30 is then manually raised, drawing up the foot 32 into engagement, by means of its toes, with the ratchet 35 and the rod 42, thus locking said arm 43 and said finger 47 and said foot 32 and the piston in said cylinder 29 in set position. The manual control of the arm 43 may then be withdrawn. Manual control of the arm 21 is, however, still retained until the cross-head 14 is raised and the foot 17 thereby brought into engagement with the rod 20, after which latter operation manual control of said arm 21 is abandoned. The complete device will then be in set position and may be abandoned to operate automatically. The foot 17, actuated by its controlling-spring device or devices, will immediately begin slowly to slide upon said rod 20 in the direction C D until it slides off of the end of the same, the time taken being approximately as indicated on the scale 19 by the finger 18$^a$ at the highest point to which said finger was raised. The arm 21 will then be retracted by the spring 53, and the finger 27 will thus be caused to disengage from the finger 26, thus freeing the lever 25, which under the impulse of its actuating-spring device will be rocked, so that its outer arm 25$^a$ will strike or otherwise operate upon the lever 3 or such other devices foreign to my invention as it may be applied to and be suitable to operate. The operation thus far will be sufficient to operate said lever 3 when taking an instantaneous photograph or when taking a time exposure in such cases as when the shutter is afterward closed by automatic devices forming part of the camera, and exclusive of my said invention and under such circumstances the remainder of the invention except the signal 63 need not necessarily be set for action. The operation of the remainder of my device is designed for the purpose of determining the period that the camera-shutter remains open when the determination of such period is not effected in any other way. At the same time the arm 25$^a$ of said lever 25 operates upon said lever 3 the other arm of said lever 25 will carry the pin 28 forcibly against the arm 39, thus causing the frame or lever 36 to swing on its pivots and withdraw said ratchet from engagement with the toe 34. Immediately the toe 41 under the impulse of its actuating-spring devices begins to slide upon said rod 42 in the direction X Y until it slides out of engagement therewith, the time taken being approximately as indicated on the scale 58 by the finger 57ª at the highest point to which said finger was raised, such period being approximately that predetermined upon for the exposure of the plate in such camera or for the continuance of operation of such devices as my invention may in practice be applied to and be suitable to operate.

If desired, only the mechanism controlling and operating the lever 25 and sufficient to operate the signal 63 need be set and operated, the remainder of the mechanism standing idle or being removed. This setting of only part of the mechanism is all that is necessary under many conditions.

When either cross-head is drawn up, the piston connected therewith is drawn against the action of the spring in the corresponding cylinder through the fluid with which the cylinder is filled, tending to form a vacuum on the lower side of the piston. The fluid above the piston, however, simultaneously forces the ball down in said cage and out of the central aperture in the piston, the fluid passing through said aperture to fill such vacuum. While said piston is descending the ball is pressed upward into said aperture, and the fluid below the piston can only find its way above it by filtration around the edges of said piston. Thus the descent of the piston will be slow; but, if desired, said piston or pistons may be constructed so as to permit fluid to escape in either or both ways with comparative rapidity.

Having now described my invention, what I claim, and desire to secure by Letters Patent, is—

1. The combination with a suitable casing, of a lever mounted therein and extending outwardly thereof, operating means adapted to operate said lever, a second lever adapted to arrest the first-said lever in set position, retracting means adapted to retract said second lever, a cylinder, a piston in said cylinder, a piston-rod connected to said piston and extending out of one end of said cylinder, lever-governing means carried by said piston adapted to arrest the second-said lever in set position during a portion of the period of movement of said piston in said cylinder, and piston-governing means adapted to control the movement of said piston.

2. The combination with a suitable casing, of a lever mounted therein and extending outwardly thereof, operating means adapted to operate said lever, a second lever adapted to arrest the first-said lever in set position, retracting means adapted to retract the second-said lever, a cylinder, a piston in said cylinder, a piston-rod connected with said piston and extending out of one end of said cylinder, lever-governing means carried by said piston and adapted to arrest the said second lever in set position during a portion of the movement of said piston in said cylinder, governing means adapted to engage the lever-arresting means carried by said piston and to prevent lever-disengaging movement of the lever-governing means carried by said piston-rod, retracting means adapted to retract the last-said lever-arresting means, and means adapted to actuate said piston.

3. The combination with a suitable support, of a lever mounted thereon, actuating means adapted to actuate said lever, a second lever adapted to arrest the first-said lever in set position, retracting means adapted to retract the second-said lever, a spring-actuated fluid-controlled timing device adapted for an approximately predetermined period to lock said second lever in set position, a third lever mounted on said support, means adapted to actuate said third lever, a fourth lever adapted to arrest said third lever in operative set position, means adapted to retract said fourth lever, a second spring-actuated fluid-controlled timing device adapted to arrest said fourth lever in operative set position, a fifth lever adapted in operation to arrest the first-said spring-actuated fluid-controlled timing device in set position and adapted to be retracted by said third lever when the latter-said lever is actuated, the first-said timing device being adapted to continue its arresting action upon said second lever for an approximately predetermined period after the retraction of said fifth lever and then to automatically release said second lever, a sixth lever, adapted to be arrested in set position by said third lever, and means for operating said sixth lever.

4. The combination with a suitable support, of levers mounted thereon, means adapted to retract said levers respectively spring-actuated fluid-controlled timing devices engaging one of said levers and adapted to temporarily prevent the retraction of said one of said levers, other spring-actuated fluid-controlled timing devices adapted to engage another of said levers and temporarily prevent the retraction of said other of said levers and adapted to be governed by the first-said devices.

5. In a tripping mechanism, the combination with a suitable support, of a series of levers mounted thereon and adapted to be held in set position, means adapted to retract said levers from said set position, a timing mechanism comprising a fluid-filled cylinder containing a spring-actuated fluid-controlled piston having a port extending therethrough, a check-valve governing the flow of said fluid through said port in one direction, means adapted to actuate said piston, a piston-rod connected to said piston, lever-engaging means carried by said rod and adapted to engage the last lever of said series and to hold it in set position for an approximately predetermined period and adapted at the expiration of said period to release said last lever, the construction being such that each of the others of said levers will be held in set position by the respectively next succeeding lever of the series and will be released upon the release of the said respectively next succeeding lever.

6. The combination with a suitable support, of a series of levers mounted thereon and adapted to be held in set position, means adapted to retract said levers from set position, a timing mechanism comprising a fluid-filled cylinder, a spring-actuated fluid-controlled piston in said cylinder and having a port extending through said piston, a check-valve adapted to prevent the flow of said fluid through said port in one direction, a piston-rod connected to said piston, lever-engaging means carried by said rod and adapted to engage the last lever of said series and to hold it in set position for an approximately predetermined period, a second series of levers mounted on said support and adapted to be held in set position, means adapted to release said levers from set position, a second timing mechanism comprising a fluid-filled cylinder, a spring-actuated fluid-controlled piston in the latter-said cylinder and having a port extending through the latter-said piston, a check-valve adapted to prevent the flow of fluid through the latter-said port in one direction, a piston-rod connected to the latter-said piston, lever-engaging means carried by the latter-said rod and adapted to engage the last lever of said second series and adapted to hold it in set position for approximately a period predetermined upon, the construction being such that each of said levers except the last of each of said series will be held in set position by the respectively next succeeding lever of the respectively corresponding series, a lever mounted on said support and adapted in set position to engage the lever-engaging means carried by the piston-rod of said second timing mechanism, to prevent the retraction of the last-said lever-engaging means, and adapted to extend into the path of one of the levers of the first-said series and to be retracted from set position by the last-referred-to lever of the first-said series during the retracting movement of said lever of the first-said series.

7. The combination with a suitable support, of a lever mounted thereon, means for holding said lever in operative position and comprising a fluid-filled cylinder, a piston therein provided with a port extending through said piston, a cage secured in or to said piston, a ball-valve positioned in said cage and adapted in operation to prevent a flow of fluid through said port in one direction, a piston-rod connected to said piston, a spring adapted to move said piston in the direction from which the flow of fluid through said port is prevented, and lever-engaging means carried by said piston-rod and adapted to engage said lever to hold the same in set position and adapted to disengage from said lever when said piston reaches the end of its stroke under the impulse of said spring.

In testimony whereof I hereunto affix my signature in presence of two witnesses.

ALFRED E. WATTS.

Witnesses:
JAMES T. WATSON,
ANDEN JOHNSON.